United States Patent
Steichen et al.

(10) Patent No.: US 7,089,499 B2
(45) Date of Patent: Aug. 8, 2006

(54) PERSONALIZING USER INTERFACES ACROSS OPERATING SYSTEMS

(75) Inventors: Jennifer L. Steichen, Yorktown Heights, NY (US); Sharon M. Trewin, Sleepy Hollow, NY (US); Myung W. Kim, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 09/794,338

(22) Filed: Feb. 28, 2001

(65) Prior Publication Data

US 2002/0118223 A1    Aug. 29, 2002

(51) Int. Cl.
 G06F 3/00 (2006.01)
 G06F 17/00 (2006.01)
 G06E 1/00 (2006.01)

(52) U.S. Cl. .............. 715/744; 715/707; 715/748; 706/15; 706/46

(58) Field of Classification Search .......... 345/707, 345/744, 745, 746, 747; 715/744, 745, 746, 715/747, 748, 707; 706/11, 15, 46
See application file for complete search history.

(56) References Cited

U.S. PATENT DOCUMENTS

| | | | | |
|---|---|---|---|---|
| 5,600,781 A | * | 2/1997 | Root et al. ............ | 345/745 |
| 5,814,798 A | * | 9/1998 | Zancho ................. | 235/380 |
| 5,831,608 A | * | 11/1998 | Janay et al. ........... | 345/745 |
| 6,023,714 A | * | 2/2000 | Hill et al. ............. | 715/513 |
| 6,081,265 A | * | 6/2000 | Nakayama et al. ..... | 345/746 |
| 6,466,897 B1 | * | 10/2002 | Yoshida ................ | 702/186 |
| 6,483,523 B1 | * | 11/2002 | Feng .................... | 345/745 |
| 6,538,668 B1 | * | 3/2003 | Ruberg et al. ......... | 345/747 |
| 6,587,125 B1 | * | 7/2003 | Paroz ................... | 345/740 |
| 6,779,027 B1 | * | 8/2004 | Schunicht et al. ...... | 709/223 |
| 2002/0104080 A1 | * | 8/2002 | Woodard et al. ....... | 717/176 |
| 2003/0033402 A1 | * | 2/2003 | Battat et al. ........... | 709/224 |

* cited by examiner

*Primary Examiner*—Kristine Kincaid
*Assistant Examiner*—Ting Zhou
(74) *Attorney, Agent, or Firm*—Whitham, Curtis, Christofferson & Cook PC; Stephen C. Kaufman

(57) ABSTRACT

A user-centered interface agent learns user preferences and typical behaviors and, based on what is learned, predicts the user's preferred user interface for different types of host computers. The interface agent consists of a learning program which operates on the user's primary computer, a shadow program which is installed on a Personal Digital Assistant (PDA), and a remote program which operates on host computers. The PDA transfers data between the primary and remote machines, and can also be used as the user's primary computer. On the primary computer, the agent learns a user's preferences automatically by observing the user's actions, requiring minimal initialization by the user. The learning algorithm may be statistical, rule-based, case-based, neural network, or employ any other technique for reasoning under uncertainty. The automated personalizing of a user interface configuration has a particular advantage for individuals with disabilities who require configuration before they can use a new computer system.

20 Claims, 8 Drawing Sheets

PERSONALIZING USER INTERFACES ACROSS OPERATING SYSTEMS

BACKGROUND OF THE INVENTION

1. Field of the Invention

The present invention generally relates to providing consistent user interfaces to users of computers and, more particularly, to a personalizing User Interface Agent which operates by learning user preferences and behaviors on a primary computer and, through knowledge of a host computer's capabilities, by reasoning to predict a user's preferred interface on the host computer.

2. Background Description

The number of different operating systems and hardware platforms for computers has increased substantially. Also, more people are using a wider variety of computers in various situations. Typically, work, school, home, public libraries, and Internet cafes may all have different operating systems and/or operating system defaults.

One disadvantage of using a variety of computers with different default settings and operating systems is that the amount of time and effort needed for a user to learn how to use all the different types of computers is staggering. Another disadvantage, particularly for non-expert computer users and people with disabilities, is that the users may be prevented from using computers either because they are not familiar enough with the computer environments or because the default settings are not appropriate.

The general problem of a consistent or similar user-interface has been considered by IBM in their "Portable Personality" product as described by Victor D. Chase in "Wherever you go, there you are", *IBM Research*, Number 2, (2000). This is a software/hardware product that duplicates many aspects of a Windows operating system user interface on host computers by using IBM's "Microdrive" hardware. The "Microdrive" hardware is a tiny disk drive that can hold up to 1 gigabyte (GB) and can carry personal settings which are automatically inserted into a host machine and removed when the hardware is removed. A utility program that is part of the software package is installed on the principal computer and copies the user profile to the "Microdrive" hardware. In the process, the utility program copies all documents listed as "recent", as well as the software used to create the documents. At the secondary computer, the user inserts the "Microdrive" hardware into the computer's PC card slot, and the computer immediately looks and acts like the principal computer. While the "Portable Personality" product offers the significant advantage of reducing what must be carried between locations, this software/hardware product has the disadvantages of requiring expensive and specialized hardware to run, working on only one operating system, and copying rather than learning the user's preferences.

U.S. Pat. No. 5,983,273 to Christopher M. White et al., assigned to Web TV Networks, describes a similar product using smart card hardware that has similar drawbacks. In the White et al. system, an Internet terminal reads identification information from a smart card and transmits the identification information to a server. The server locates configuration information associated with a particular user of the server and downloads the configuration information to the Internet terminal.

A solution to the problem of providing a consistent or similar user-interface between computers without the drawbacks of prior solutions is needed.

SUMMARY OF THE INVENTION

It is therefore an object of the present invention to provide a means to learn, transfer information about, and reason about the user's preferences across a variety of computer systems. In addition, it is preferable that the user has ready access and ownership of their preferences and patterns of behavior.

Another object of the invention is to provide an interface agent that greatly improves accessibility of computers for users with disabilities and for inexperienced computer users.

According to the invention, there is provided a personalizing User-centered Interface Agent which eases the problem of unfamiliar user interfaces on host computers. The personalizing User Interface Agent operates by learning user preferences and typical behaviors of a particular user and predicting the user's preferred user interface for different types of host computers. Most of the personalizing User Interface Agent's learning is through observation, requiring minimal initialization by the user.

The personalizing User Interface Agent consists of a learning program which operates on the user's primary computer, a shadow program which is installed on a Personal Digital Assistant (PDA), and a utility program which operates on host computers. The role of the PDA includes the transfer of data between the primary and remote machines, and the PDA can also be the user's primary computer. On the primary computer, the agent learns a user's preference by observing the user's actions. The user may run an agent-training module or directly query and modify the agent's current state of knowledge, but the user is not forced to explicitly teach the agent. The learning algorithm may be statistical, rule-based, case-based, neural network, or employ any other technique for reasoning under uncertainty. The automated way of reaching a usable configuration has a particular advantage for individuals with disabilities who require configuration before they can use a new computer system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

A method and apparatus are described for providing a personalizing User Interface Agent. In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps can be embodied in machine-executable instructions, which can be used to cause a general-purpose or special-purpose processor programmed with the instructions to perform the steps. Alternatively, the steps of the present invention might be performed by specific hardware components that contain hardwired logic for performing the steps, or by any combination of programmed computer components and custom hardware components.

SYSTEM OVERVIEW

Figure 1:
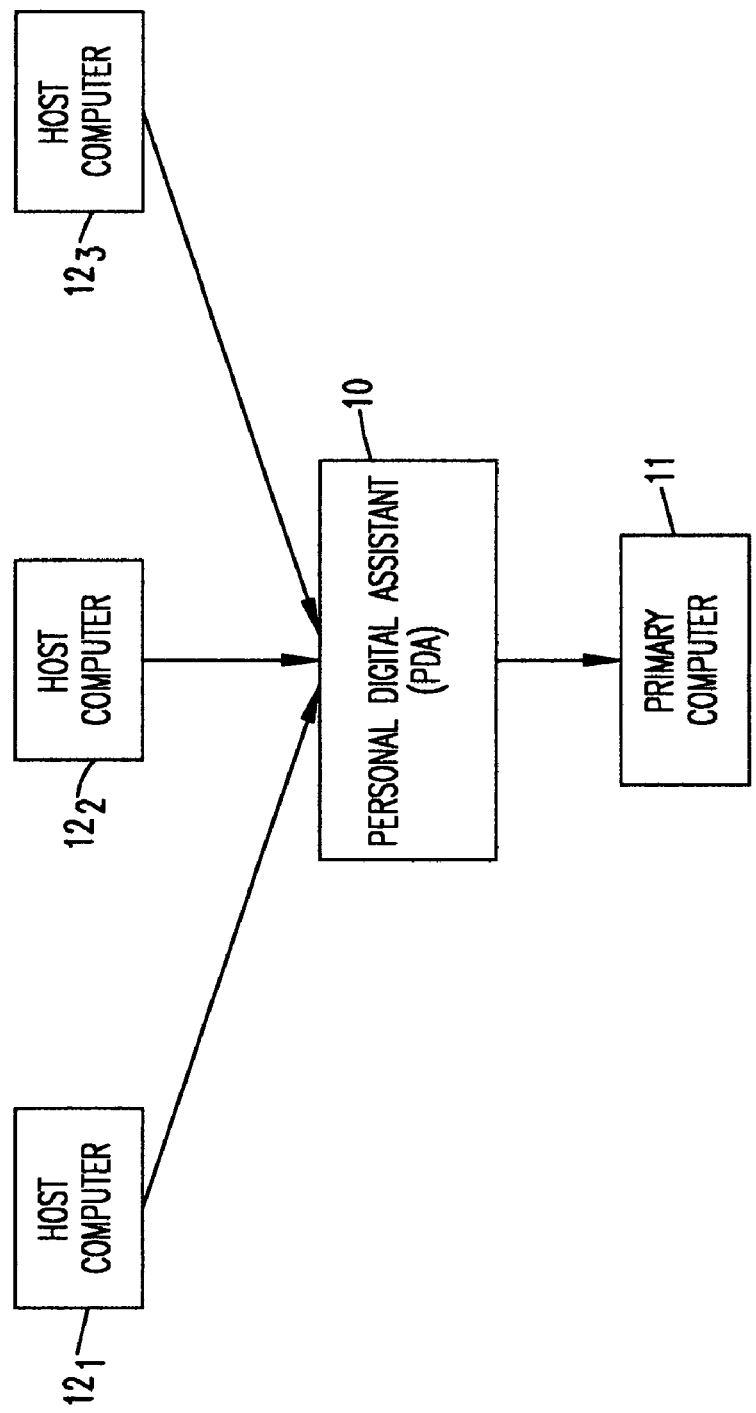
FIG. 1 is a block diagram showing the hardware and communications needed between the hardware of the invention.

The present invention may be included in a system for providing a user with the ability to learn and communicate the user's preferences and patterns of behavior for computer settings. FIG. 1 illustrates the hardware and the communications between hardware for the personalizing User Interface Agent. FIG. 1 shows in block diagram form the relationship between the personalizing User Interface Agent according to the invention, running on a personal digital assistant (PDA) 10, and a primary computer 11 and a plurality of host computers $12_1$, $12_2$ and $12_3$. The host machines $12_1$, $12_2$ and $12_3$ will be enabled to interpret user preferences communicated from the user's personal digital assistant (PDA) 10. These preferences are learned from user interactions with a primary computer 11 as well as possibly from the various host machines. The PDA 10 may communicate with the primary computer 11 and with the host computers $12_1$, $12_2$ and $12_3$ via a hardware cradle, disk drive, wireless or other means. Each of the host computers $12_1$, $12_2$ and $12_3$ may be different hardware platforms running different operating systems such as, for example, a Windows operating system, a Macintosh operating system and a Unix operating system, and these operating systems may be different from the operating system running on the primary computer 11. The personalizing User Interface Agent operates by learning user preferences and typical behaviors of a particular user and predicting the user's preferred user interface for each of the different types of host computers. User information is stored in an operating system-independent format on the PDA 10 and primary computer 11.

Figure 2:
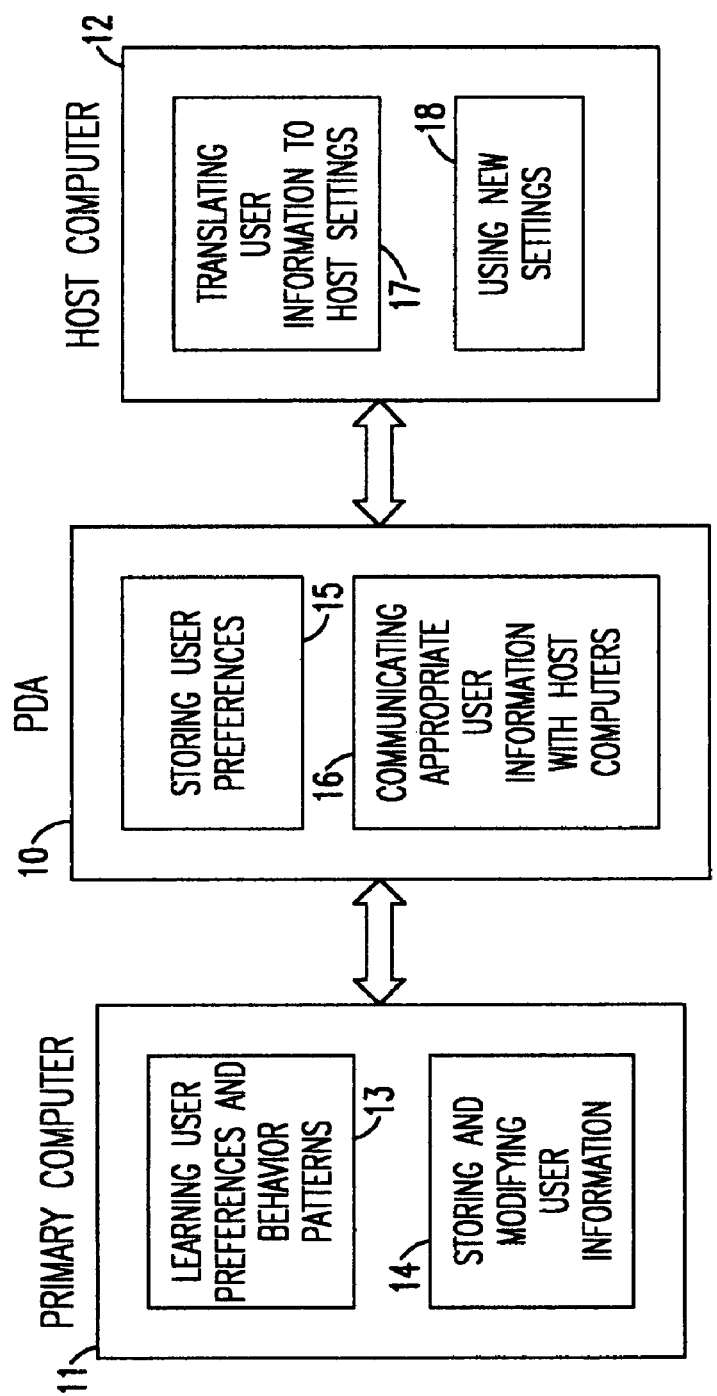
FIG. 2 is a block diagram showing the different software components of the invention running on the primary computer, personal digital assistant (PDA), and a host computer.

FIG. 2 shows the relationship between the software programs of the personalizing User Interface Agent. This software consists of three programs: transmitting program on the PDA 10, the learning program on the primary computer 11, and the agent utility program on a host computer 12. The transmitting program running on the PDA 10 communicates at 16 first of all with the primary computer 11 to obtain user information, as indicated at 13. The learning program in the primary computer 11 learns user information by various means, including observation of user actions. The transmitting program on the PDA 10 also transmits some of the user information to the host computer 12. The amount of user information transmitted may depend on privacy settings that the user has chosen. The agent utility program on the host computer 12 uses the transmitted information to adapt the host computer's user interface to this particular user.

For example, a user who, due to a disability, types by pressing keys for a relatively long time will prefer to use a keyboard with a long time delay before keys start to repeat. This prevents unwanted extra characters from appearing. The learning program on the primary computer 11 can learn a user's ideal key repeat delay by observing the length of their key presses and the variation in key press lengths. An appropriate key repeat delay is longer than 98% of the user's keystrokes, disregarding keys which can be deliberately held down such as the delete key or the arrow keys. Another keyboard setting which the learning program on the primary computer 11 can learn is the "Sticky Keys" setting, that allows users to press the SHIFT, CONTROL and ALT keys prior to the key they wish to modify, instead of pressing both at the same time. It is particularly useful for one-handed typists. Users who have difficulty with modifier keys exhibit specific behavior patterns such as dropping the shift key before pressing the key to be shifted, or using the CAPS LOCK key to produce a single capital letter. By gathering evidence from such behaviors and using a threshold value, the learning program determines whether this user would find "Sticky Keys" useful. These preferences are learned rather than copied from a user profile because the user profile often does not reflect the true preferences of the user. Users may be unaware of relevant options, or their requirements may change frequently due to factors such as fatigue. Other keyboard preferences, such as the key acceptance delay and the debounce time can also be learned through observation, as evidenced by the IBM "Keyboard Adjuster" research prototype, which analyses a user's typing and identifies the most appropriate keyboard settings for that user. See "A model of keyboard configuration requirements" by Shari Trewin and Helen Pain, *Behaviour & Information Technology*, 1999, vol. 18, no. 1, pp. 27–35. As new user preferences and patterns of behavior are learned, the learning program will modify the user information stored at 14. This user information may be stored in a text file on the primary computer 11, each line containing the name of the preference and the appropriate value. Other information, such as variations in preferences in different locations, can also be stored. The entry for the key repeat delay would appear as: "keyRepeat 500", and the entry for Sticky Keys would appear as: "StickyKeys on". The transmitting program on the PDA 10 copies this user information file from the primary computer and stores it at 15.

Then, the PDA 10 uses the transmitting program 16 to communicate with the agent utility program 17 on the host computer 12 to translate the stored user information to host settings. The agent utility program 17 on the host machine 12 accomplishes this translation. The agent utility program receives the user information and then combines this with knowledge of the specific operating system to generate a set of user information settings 18 that can be implemented on this particular host computer. This knowledge is contained within a file on the host computer 12 which is specific to the operating system. For every preference there is an entry in this file. The entry indicates whether the preference is available on this operating system, what host-specific utility is required to make it available, what the set of allowable settings for this preference is, and what other preferences are incompatible with each setting. It also gives the name of the function to call to fetch the current value for this preference, and to set a new value. These functions are implemented within the agent utility program itself, and will call operating system specific functions. For example, the entry for the "keyRepeat" preference would be:

KeyRepeat available n/a [250, 300, 600, 750, 1000]
[[(750, 1000), (debounce>0)]] int getWindowsKeyRepeat( )
void setWindowsKeyRepeat(int)

This entry indicates that the key repeat preference is available on Windows, the possible settings are 250, 300, 600, 750 and 1000, and that the two highest settings are incompatible with a debounce time greater than 0. The functions to call to fetch and set a keyRepeat value follow. The argument list to the setWindowsKeyRepeat function matches the type of the entries given for the possible settings.

The closest available set of user interface settings will be chosen and used at 18, although not all of a user's preferences may be available for implementation on every operating system. For example, Windows users who have a tremor may choose to have a "debounce" time on their keyboards. This means that accidental repeat presses of keys do not register. However, this option is not available on the Macintosh operating system. Similarly, the specific set of choices for the key repeat delay varies between operating systems. The agent utility program 17 on the host 12 may give users the choice of either being consulted or having the utility program make automatic adjustments, when their ideal settings are unavailable. Where users' preferences could be met by downloading an additional host-specific utility, users are informed and offered assistance in installing the software. The PDA 10 itself also stores and the transmitting program can install some host-specific utilities which implement essential preferences not included as part of the standard distribution in all operating systems (e.g., the AccessDOS software is a host-specific utility which implements keyboard accessibility settings for Windows 3.1 platforms). Finally, the agent utility program translates the chosen preferences into application program interface (API) function calls on the host system, which are executed to produce the desired interface changes. The utility program has a function to activate each preference on each kind of known operating system. For example, on Windows, the key repeat delay can be set to 1000 ms with the following C++ code (error checking omitted for clarity):

```
FILTERKEYS fk;
fk.cbSize=sizeof(FILTERKEYS);
SystemParametersInfo(SPI_GETFILTERKEYS,
sizeof(FILTERKEYS), (void *) &fk, 0);
fk.dwFlags |=FKF_FILTERKEYSON;
fk.iDelayMSec=1000;
SystemParametersinfo(SPI_SETFILTERKEYS,
sizeof(FILTERKEYS),
(void *) &fk, SPIF_SENDCHANGE));
```

Executing this code sets the appropriate key repeat delay. Prior to making changes to the user interface, the agent utility program stores the original key repeat delay value. When the user leaves, the original settings are restored.

Figure 3:
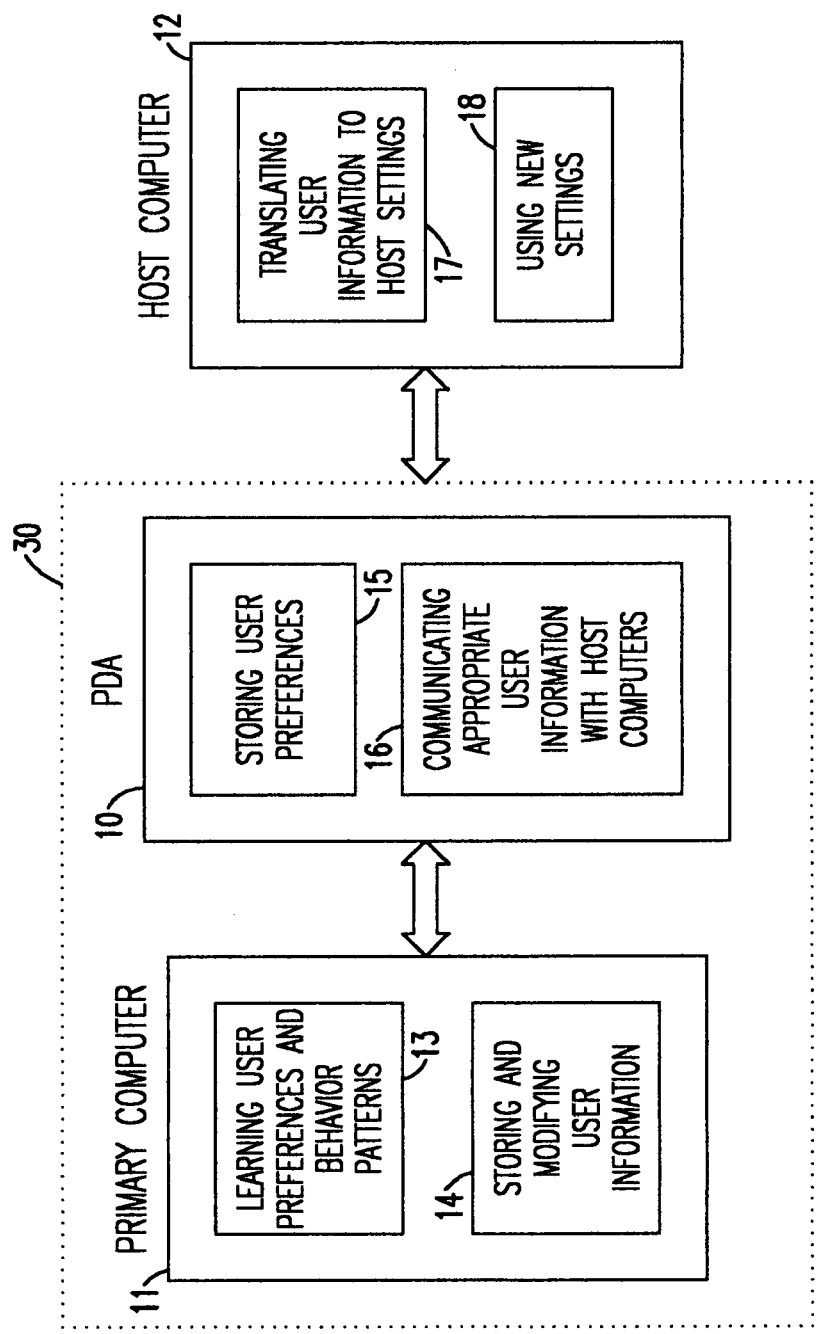
FIG. 3 is a block diagram showing an alternative configuration of the software components of the invention.

FIG. 3 shows an alternative relationship between the software components of the personalizing User Interface Agent. In this figure, the primary computer 11 is the same as the PDA 10; that is, the PDA is the user's primary computer 30. Alternatively, the transmitting program may be installed on the user's primary computer, say a desk top computer, and the transmitting program communicates with the desired host computer over a network (wireless or otherwise) including a wide area network (WAN), such as a corporate intranet, or over a global network, such as the Internet. In either case, the primary computer will perform all of the functions assigned to both the primary computer 11 and the PDA 10 in FIG. 1 while the host computer 12 performs the same function in the cases described by both FIGS. 1 and 2.

Figure 4:
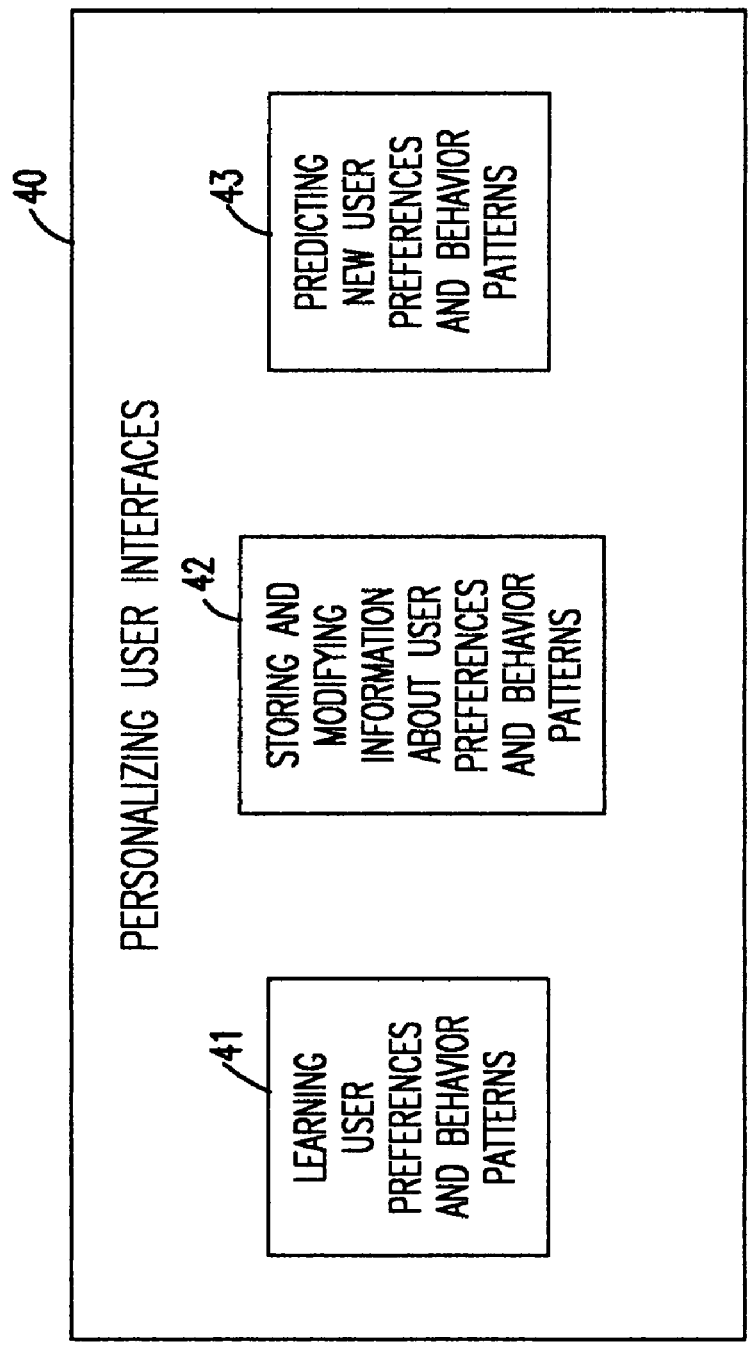
FIG. 4 is a block diagram showing the different software modules of the personalizing User Interface Agent according to the invention.

As shown in FIG. 4, the personalizing User Interface Agent 40 comprises three modules. The first module 41 is the learning module which learns the user preferences and behavior patterns. This occurs while the user is working on the primary computer 11 and it may also occur while working on a host computer 12. The second module 42 is the module that stores and modifies information about user preferences and behavior patterns. This user information is stored on the primary computer 11 (or temporarily on a host computer 12 if the learning took place on a host computer) and transferred to the PDA 10. This user information is then available to be transferred to a host computer.

The third module 43 in FIG. 4 predicts new user preferences and behavior patterns using this user information. This module is active after the PDA 10 has communicated the user information to the host computer 12. Say, for example, the primary computer 11 is running a Windows operating system and the host computer is running a Unix operating system, the third module 43 predicts the user preferences and behavior patterns for the Unix environment using information learned when the user was in the Windows environment.

Figure 5:
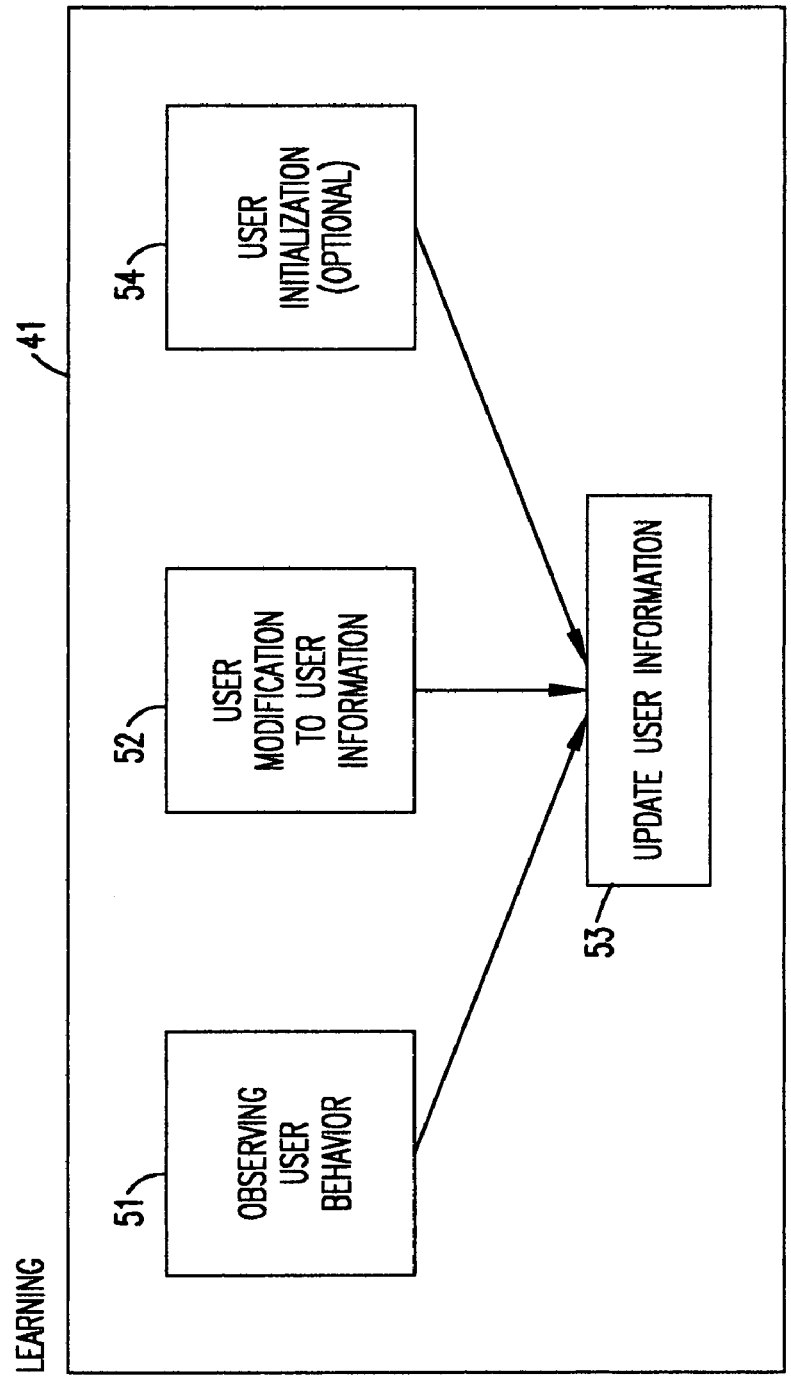
FIG. 5 is a flow diagram illustrating the basic logic of the learning module of the personalizing user interfaces program according to the invention.

FIG. 5 shows the logic of the learning module 41. This module operates by first of all observing the user behavior at 51. In addition, user modifications to preferences at 52 are captured. Both observed user behavior and user modifications to user information are used to update the user information at 53. Optionally, user initialization of preferences at 54 can also be used to update user information.

Figure 6:
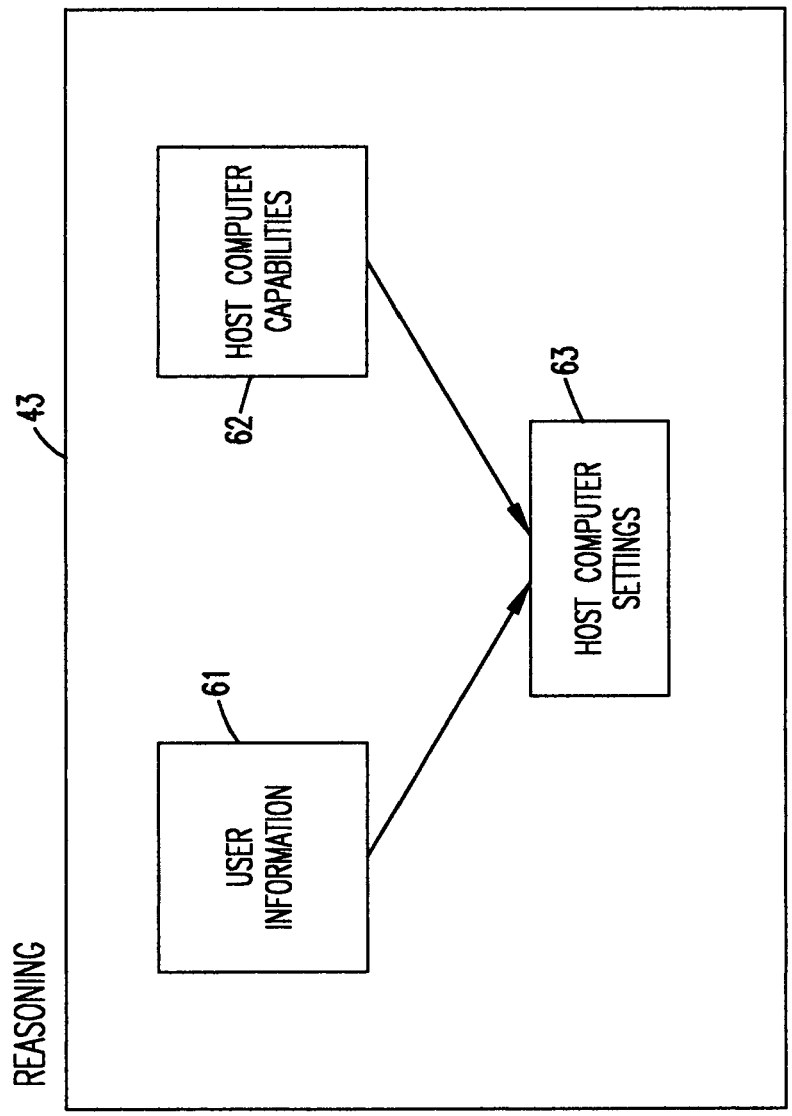
FIG. 6 is a flow diagram illustrating the basic logic of the reasoning module of the personalizing user interfaces program according to the invention.

The third module 43 in FIG. 4 is shown in FIG. 6 and performs a reasoning function. The user information 61 acquired by the learning module 41 are combined with the host computer capabilities 62 to generate host computer settings 63. The host computer capabilities 62 may include hardware capabilities as well as the operating system environment and perhaps other software applications installed on the host computer.

Figure 7:
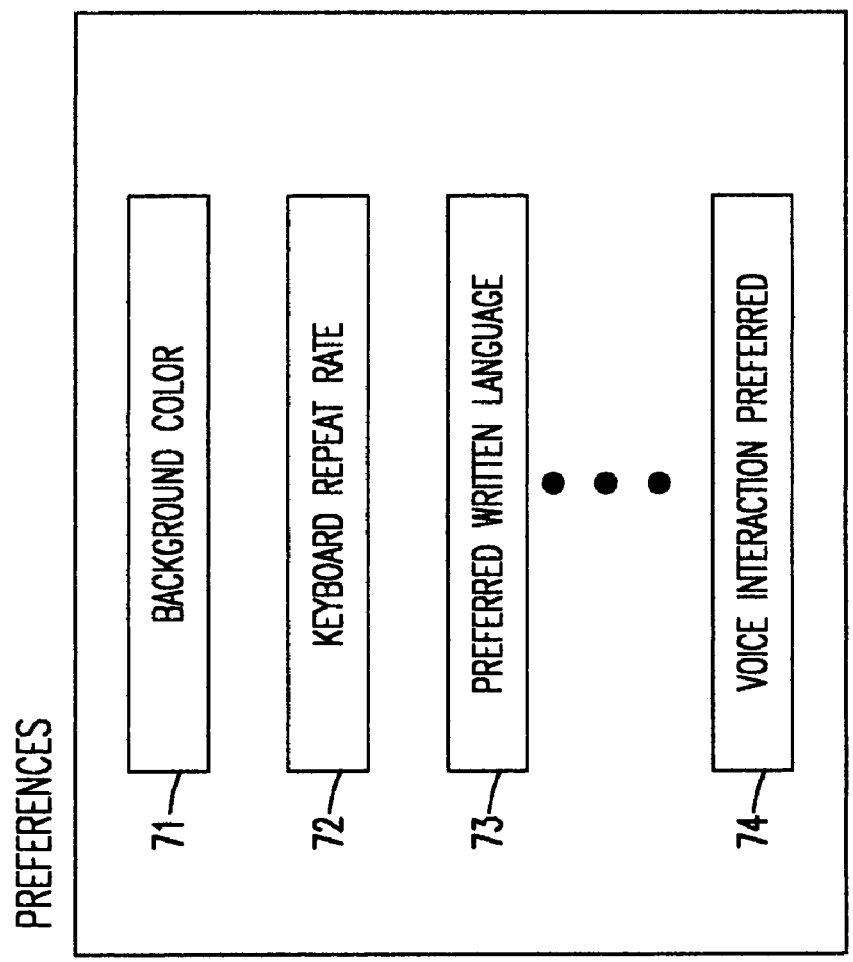
FIG. 7 is a block diagram illustrating the type of data stored in the user information of the personalizing User Interface Agent according to the invention.

FIG. 7 provides an example of the type of information which would be included in the user information. This might include background color 71, keyboard repeat rate 72, and preferred written language 73, among other preferences. In some cases, such as for those who are disabled, the preferred user information may include whether voice interaction is preferred 74.

Figure 8:
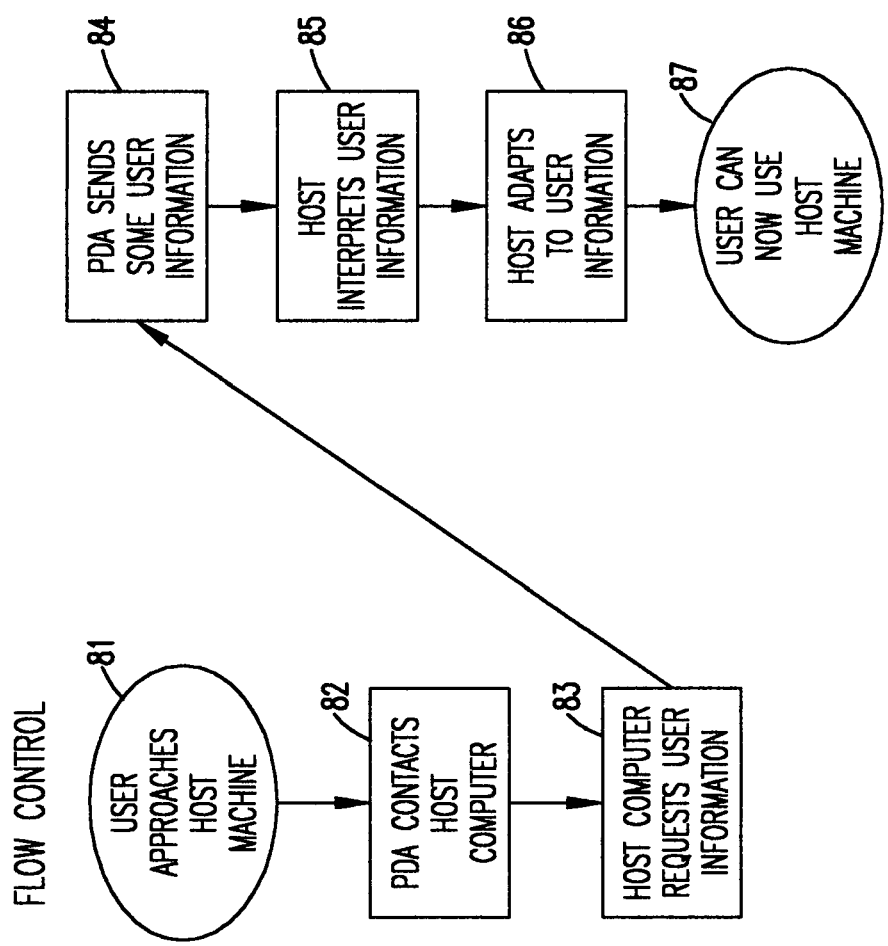
FIG. 8 is a flow diagram illustrating the processes involved in the use of the personalizing User Interface Agent according to the invention.

In practice, as shown in FIG. 8, a user first approaches a host machine 81. The PDA running the transmitting program contacts the host computer at 82, and the host computer requests user information at 83. The PDA responds by providing the stored user information at 84. The host computer interprets the user information at 85 and adapts the user information at 86 to provide the user with a user interface that is as close to their familiar user interface on the user's primary computer. At this point, the user can use the host machine at 87.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer User Interface Agent comprising:
    computer implemented means for learning computer user preferences and behaviors on a primary computer based upon automated observation of said user's use of a user interface on said primary computer without forcing the user to explicitly teach the Agent; and
    computer implemented means for reasoning from a) the learned preferences and behaviors and b) a host computer's user interface capabilities in order to predict a preferred interface of said user on the host computer, said learned preferences on the primary computer being preferences for selected values of user interface settings on the primary computer and said predicted preferences on the host computer being preferences for selected values of user interface settings on the host computer, said primary computer settings and selected values being different from said host computer settings and selected values, said reasoning means being able to translate from said primary computer settings and selected values to a closest available set of said host computer settings and selected values where ideal primary computer settings are not available because of said differences,
    wherein said translation by said reasoning means employs a technique for reasoning under uncertainty to obtain said closest available set of host computer settings.

2. The computer User Interface Agent according to claim 1, wherein said means for learning comprises a software module which downloads user preferences existing on the primary computer and observes user behavior in using the primary computer, the means for learning including storing means for storing data on preferences and behavior.

3. The computer User Interface Agent according to claim 2, wherein said storing means stores data in operating system independent format.

4. The computer User Interface Agent according to claim 3, wherein said means for reasoning comprises a software module which accesses data stored by said storing means and accesses information of the host computer's hardware and software capabilities and generates a user interface on the host computer which most closely approximates the user interface on the primary computer, and wherein said technique for reasoning under uncertainty is a neural network.

5. The computer User Interface Agent according to claim 4, further comprising a utility program running on the host computer providing information on the host computer's hardware and software capabilities and responding to the means for reasoning to generate the user interface on the host computer.

6. The computer User Interface Agent according to claim 5, wherein the User Interface Agent runs on a personal digital assistant (PDA) which is first connected to the primary computer to learn user preferences and behaviors and then connected to the host computer to predict the user's preferred interface.

7. The computer User Interface Agent according to claim 5, wherein the User Interface Agent runs on the primary computer to first learn user preferences and behaviors and subsequently, through a remote connection to the host computer, to predict the user's preferred interface on the host computer.

8. A method for personalizing user interfaces across operating systems comprising the steps of:
    learning by a computer a user's preferences and behavior on a primary computer based upon automated observation of said user's use of a user interface on said primary computer without forcing the user to explicitly teach the computer;
    storing data defining the learned preferences and behavior; and
    reasoning by a computer from a) the stored learned preferences and behavior and b) knowledge of a host computer's user interface capabilities to predict a user's preferred interface on the host computer, said learned preferences on the primary computer being preferences for selected values of user interface settings on the primary computer and said predicted preferences on the host computer being preferences for selected values of user interface settings on the host computer, said primary computer settings and selected values being different from said host computer settings and selected values, said reasoning means being able to translate from said primary computer settings and selected values to a closest available set of said host computer settings and selected values where ideal primary computer settings are not available because of said differences,
    wherein said translation by said reasoning means employs a technique for reasoning under uncertainty to obtain said closest available set of host computer settings.

9. The method for personalizing user interfaces across operating systems according to claim 8, wherein the stored data is in a format independent of operating systems.

10. The method for personalizing user interfaces across operating systems according to claim 9, wherein the step of learning is performed by a software learning module running on a personal digital assistant (PDA), the software learning module operating to download user preferences existing on the primary computer and to observe user behavior in using the primary computer.

11. The method for personalizing user interfaces across operating systems according to claim 10, wherein the step of reasoning is performed by a software reasoning module running on the PDA which accesses stored data and accesses information of the host computer's hardware and software capabilities and generates a user interface on the host computer that most closely approximates the user interface on the primary computer, and wherein said technique for reasoning under uncertainty is a neural network.

12. The method for personalizing user interfaces across operating systems according to claim 11, further comprising the step of running a utility program running on the host computer to provide information on the host computer's hardware and software capabilities that is accessed by the reasoning software module to generate the user interface on the host computer.

13. The method for personalizing user interfaces across operating systems according to claim 9, wherein the step of learning is performed by a software learning module running on the primary computer, the software learning module operating to download user preferences existing on the primary computer and to observe user behavior in using the primary computer.

14. The method for personalizing user interfaces across operating systems according to claim 13, wherein the step of reasoning is performed by a software reasoning module running on the primary computer which accesses stored data and accesses information of the host computer's hardware and software capabilities and generates a user interface on the host computer that most closely approximates the user interface on the primary computer.

15. The method for personalizing user interfaces across operating systems according to claim 14, further comprising the step of running a utility program running on the host computer to provide information on the host computer's hardware and software capabilities that is accessed by the reasoning software module to generate the user interface on the host computer.

16. An interface agent that improves accessibility of computers running different operating systems for users with disabilities comprising:

computer implemented means for automatic learning of computer user preferences and behaviors on a primary computer, said means for learning further comprising means for observing a user's actions without forcing the user to explicitly teach the interface agent, said actions including at least keystrokes and error correction behavior; and computer implemented means for reasoning from a) the learned preferences and behaviors and b) a host computer's capabilities in order to predict and automatically implement said user's preferred interface on the host computer, said learned preferences on the primary computer being preferences for selected values of settings on the primary computer and said predicted preferences on the host computer being preferences for selected values of settings on the host computer, said primary computer settings and selected values being different from said host computer settings and selected values, said reasoning means being able to translate from said primary computer settings and selected values to a closest available set of said host computer settings and selected values where ideal primary computer settings are not available because of said differences, wherein said translation by said reasoning means employs a technique for reasoning under uncertainty to obtain said closest available set of host computer settings.

17. The interface agent according to claim 16, wherein said means for learning comprises a software module which downloads user preferences from the primary computer and observes user behavior in using the primary computer, the means for learning including storing means for storing data in operating system independent format on preferences and behavior.

18. The interface according to claim 17, wherein said means for reasoning comprises a software module which accesses data stored by said storing means and accesses information of the host computer's hardware and software capabilities and generates a user interface on the host computer which most closely approximates the user interface on the primary computer, and wherein said technique for reasoning under uncertainty is a neural network.

19. The interface according to claim 18, further comprising a utiity program running on the host computer providing information on the host computer's hardware and software capabilities and responding to the means for reasoning to generate the user interface on the host computer, said reasoning software module further including a utility software module which may be installed on the host computer to implement essential preferences for the disabled user on the host computer where the operating system of the host computer does not support the essential preferences and the utility program running on the host computer translates the essential preferences into application program interface (API) functions calls on the host computer.

20. The interface according to claim 19, wherein the utility software module includes assistance to the disabled user for installing the utility software module.

* * * * *